United States Patent
Hertlein et al.

(10) Patent No.: US 9,962,745 B2
(45) Date of Patent: May 8, 2018

(54) CLEANING OF CVD PRODUCTION SPACES

(71) Applicant: WACKER CHEMIE AG, Munich (DE)

(72) Inventors: Harald Hertlein, Burghausen (DE); Friedrich Popp, Ooltewath, TN (US)

(73) Assignee: WACKER CHEMIE AG, Munich (DE)

( * ) Notice: Subject to any disclaimer, the term of this patent is extended or adjusted under 35 U.S.C. 154(b) by 37 days.

(21) Appl. No.: 14/783,858

(22) PCT Filed: Mar. 20, 2014

(86) PCT No.: PCT/EP2014/055605
§ 371 (c)(1),
(2) Date: Oct. 10, 2015

(87) PCT Pub. No.: WO2014/166718
PCT Pub. Date: Oct. 16, 2014

(65) Prior Publication Data
US 2016/0045940 A1 Feb. 18, 2016

(30) Foreign Application Priority Data
Apr. 11, 2013 (DE) .................. 10 2013 206 436

(51) Int. Cl.
B08B 3/08 (2006.01)
B08B 3/10 (2006.01)
B08B 3/04 (2006.01)
C01B 33/035 (2006.01)
B08B 1/00 (2006.01)
C01B 33/02 (2006.01)

(52) U.S. Cl.
CPC .................. B08B 3/08 (2013.01); B08B 1/00 (2013.01); B08B 3/04 (2013.01); B08B 3/10 (2013.01); C01B 33/02 (2013.01); C01B 33/035 (2013.01)

(58) Field of Classification Search
CPC .... B08B 1/00; B08B 3/00; B08B 3/04; B08B 3/088; B08B 3/10; B08B 3/08; C01B 33/02; C01B 33/035
See application file for complete search history.

(56) References Cited

U.S. PATENT DOCUMENTS

| | | | |
|---|---|---|---|
| 5,108,512 | A | 4/1992 | Goffnett et al. |
| 2002/0040568 | A1 | 4/2002 | Heinemann |
| 2005/0135986 | A1 | 6/2005 | Weidhaus et al. |
| 2010/0001106 | A1 | 1/2010 | Schaefer et al. |
| 2010/0043972 | A1 | 2/2010 | Baldi et al. |
| 2012/0060562 | A1 | 3/2012 | Wochner et al. |
| 2012/0175613 | A1 | 7/2012 | Netsu et al. |
| 2013/0000672 | A1* | 1/2013 | Bovio ...................... B08B 9/08 134/8 |

FOREIGN PATENT DOCUMENTS

| | | |
|---|---|---|
| CN | 101495682 A | 7/2009 |
| CN | 102002846 A | 4/2011 |
| CN | 201906534 U | 7/2011 |
| CN | 102432018 A | 5/2012 |
| DE | 102008040231 A1 | 12/2008 |
| DE | 102012218748 A1 | 12/2012 |
| EP | 1 544 167 A1 | 6/2005 |
| EP | 2431329 A1 | 3/2012 |
| JP | 5-261232 A2 | 10/1993 |
| JP | 6-216036 A2 | 8/1994 |

OTHER PUBLICATIONS

Chen Jin et al., "Cleaning for carbon steel pipe of polysilicon production unit", Cleaning World, vol. 25, No. 7, pp. 4-18 + English abstract, Abstract Only.

* cited by examiner

Primary Examiner — Saeed T Chaudhry
(74) Attorney, Agent, or Firm — Brooks Kushman P.C.

(57) ABSTRACT

Contamination of surfaces of polysilicon rods removed from a Siemens reactor in a polysilicon production facility is reduced by cleaning the production facility at least every other week with a cleaning liquid containing water, optionally also containing neutral surfactants.

9 Claims, No Drawings

CLEANING OF CVD PRODUCTION SPACES

CROSS REFERENCE TO RELATED APPLICATIONS

This application is the U.S. National Phase of PCT Appln. No. PCT/EP2014/055605 filed Mar. 20, 2014, which claims priority to German Application No. 10 2013 206 436.5 filed Apr. 11, 2013, the disclosures of which are incorporated in their entirety by reference herein.

BACKGROUND OF THE INVENTION

1. Field of the Invention

The invention relates to a process for cleaning CVD-production rooms for producing polycrystalline silicon. The invention relates to rooms or factory halls in which polycrystalline silicon is produced by means of CVD (chemical vapor deposition).

2. Description of the Related Art

Polycrystalline silicon is usually produced by means of the Siemens process. In this process a reaction gas comprising one or more silicon-containing components and optionally hydrogen is introduced into a reactor comprising substrates heated by direct passage of current, wherein silicon deposits in solid form on the substrates. The silicon-containing components preferably used are silane ($SiH_4$), monochlorosilane ($SiH_3Cl$), dichlorosilane ($SiH_2Cl_2$), trichlorosilane ($SiHCl_3$), tetrachlorosilane ($SiCl_4$) or mixtures of the said substances.

The Siemens process is usually carried out in a deposition reactor (also termed "Siemens reactor"). In the most familiar embodiment, the reactor comprises a metallic baseplate and a coolable bell which is mounted on the baseplate, in such a manner that a reaction chamber is formed in the interior of the bell. The baseplate is provided with one or more gas inlet openings and one or more off-gas openings for the departing reaction gases and also with holders with the aid of which the substrates are held in the reaction chamber and supplied with electric current.

A plurality of such Siemens reactors are arranged in one production room. In the process, the facility also comprises a multiplicity of pipelines in order to supply the reactors with the reaction gases, namely silanes and optionally hydrogen, and in order to remove off-gases which are formed in the deposition.

Polycrystalline silicon must satisfy high purity requirements.

The polycrystalline silicon can be contaminated during removal of the rods from the reactor and during the subsequent processing steps.

The majority of the polycrystalline silicon rods produced must be comminuted to fragments, since only fragments can be further processed by the clients of the electronics and solar industries. One exception is formed by polycrystalline silicon rods which are converted directly into monocrystalline silicon rods by means of the float-zone (FZ) process and are then turned into wafers.

The rods are usually mechanically comminuted by means of crushers, which comprise metallic crushing tools. In this process the polycrystalline silicon is contaminated on the surface. Attempts are made to counteract this by various measures, e.g. via crushing tools made of hard metal which are particularly abrasion-resistant and as a result give off fewer metals to the polysilicon. If the polycrystalline silicon is intended for the electronics industry, in addition a wet-chemical cleaning of the fragments is performed, in order to etch away metals from the surface of the polysilicon.

However, the polycrystalline silicon is exposed to environmental influences during the entire processing. This begins with the removal of the rods from the reactor, and relates to the transport processes and to the following processing steps and processing in crushing, cleaning and packaging facilities. This can also lead to contamination.

In particular, removal of the rods from the reactor has been taken to be the critical step in polysilicon fabrication.

After the rods have cooled, the reactor bell is opened and the rods are withdrawn by hand or using special devices, termed removal aids, for further processing, or for interim storage. US 20100043972 A1 discloses a further device for removal of polycrystalline silicon rods, comprising a wall having an inner wall, an outer wall and a multiplicity of connections between inner wall and outer wall, a gap between inner wall and outer wall, an access window in the outer wall, a baseplate, and a multiplicity of contacts on the baseplate, wherein inner wall and outer wall are cylindrical and concentric, and the gap is dimensioned in such a manner as to take up a multiplicity of silicon rods situated on the contacts of the baseplate, wherein the access window is designed in such a manner that access to the silicon rods is made possible. The rods can be withdrawn via the access windows.

Not only storage but also further processing, especially comminution of the rods, classification and packaging of broken pieces, generally proceed under particular environmental conditions in climatically controlled rooms, which prevents contamination of the product.

Between the time point of opening the reactor and up to storage or further processing, the deposited material, however, is exposed to environmental effects, in particular dust particles.

It has been proposed to use what is termed a removal bag during removal of the polysilicon rods and to cover the silicon rod therewith. US 20120175613 A1 discloses a process for producing a polycrystalline silicon piece, consisting of a CVD process for producing a polycrystalline silicon rod by depositing silicon on a filament wire, one end of which is connected to a first electrode and the other end of which is connected to a second electrode, a process for withdrawal of the polycrystalline silicon rod from the reactor and a process for comminuting the silicon rod into silicon pieces, wherein, before the comminution process, at least 70 mm are removed from the electrode end of the polycrystalline silicon rod (shortening process). In a preferred embodiment, the surface of the polycrystalline silicon rod is covered before withdrawal from the reactor with a bag-like part made of polyethylene. The withdrawal itself can proceed by means of a crane or the like. The bag-like part is intended to prevent, during rod removal, metal grains containing nickel, chromium and copper, which after opening of the reactor are released into the working atmosphere, from accumulating on the surface of silicon rods.

In principle, it is also conceivable to carry out the production process in a clean room. US 20020040568 A1 discloses a facility for fabricating semiconductor products, in particular wafers, having an arrangement of fabrication units in at least one clean room having an air supply system, wherein, in the air supply system, the air feed proceeds via the floor of the clean room. A significant advantage of this air supply system is that the circulation of feed air and exhaust air due to gravity is exploited thereby in such a manner that the feed air is provided with a low energy consumption at the sites for processing the semiconductor products.

However, facilities for producing polycrystalline silicon have a multiplicity of Siemens reactors. It must be considered that the deposited rods can be several meters high and weigh several hundred kg. Therefore, such facilities are enormously large. Constructing a hall having dozens of Siemens reactors as a clean room is scarcely conceivable economically.

These problems resulted in the objective of the invention.

SUMMARY OF THE INVENTION

The invention provides cleaning production rooms for producing polycrystalline silicon which comprise a multiplicity of CVD reactors at least once within two weeks, wherein an aqueous cleaning liquid is used for cleaning, wherein outer casings of the CVD reactors, pipelines and floors of the production rooms are cleaned.

DETAILED DESCRIPTION OF THE PREFERRED EMBODIMENTS

It has been found that such regular cleaning of the production or deposition halls has a significant beneficial effect with respect to a lower loading of the removed silicon rods with metals and in particular with environmental elements.

For the cleaning, a fuzz-free cloth can be used. The cleaning can be performed manually.

Likewise, for the floor cleaning, cleaning machines such as brush-type, wet and dry vacuum cleaners, sweepers, scrubber-dryers, single-disk machines can be used.

As cleaning liquid, water, in particular conventional tap water, can be used.

Preference is given to the use of a mixture containing water and anionic/ionic surfactants. Preferably, the cleaning liquid contains demineralized water. Particular preference is given to the use of a mixture containing demineralized water and anionic/zwitterionic surfactants.

For example, 10 liters of demineralized water can be mixed with some tablespoons of a neutral pH cleaning agent containing 5-15% anionic surfactants and less than 5% zwitterionic surfactants, optionally containing preservatives such as methylchloroisothiazolinones and methylisothiazolinones, and used as cleaning liquid.

It is preferred in each case first to wipe the reactors and the pipelines with a fuzz-free cloth moistened with the cleaning liquid, and not until then to clean the floor of the production hall. The floor can be cleaned manually or using a cleaning machine.

Preferably, the outer casings of the CVD reactors, the pipelines and the floors of the production rooms are cleaned at least once per week.

However, particular preference is given to cleaning the floor of a production hall at least two times per week, and to clean the pipelines and the outer casings of the reactors at least once per day.

It has been found that such a type of cleaning is so efficient that the installation of expensive clean room technology is superfluous. As a result, considerable capital costs can be saved. This also has an effect on the production costs of polysilicon.

The quality of polysilicon with respect to metal values and environmental elements may be improved significantly.

It has also been found that, as a consequence of a standardization of the cleaning plans to the extent that the floors and plant components must be cleaned at least once per week, at different locations [sic] there are scarcely any differences in quality any more between polycrystalline silicon produced at the different locations. In the past, there were marked quality differences here, the causes of which were long unknown, since the production and processing operations themselves at the various locations were completely identical.

Surprisingly, in correlation tests, an indirectly proportional relationship between the frequency of the cleaning of deposition halls and the quality parameters of metals and environmental elements in the polysilicon was found.

EXAMPLE

The polysilicon produced in three deposition halls A, B and C was studied with respect to surface contamination with Fe, Zn and Na.

The production processes in the three halls were identical. The deposition was performed in identical Siemens reactors under the same conditions (temperatures, gas flows, nozzle cross sections etc.). Also, deposition was onto rods of the same diameter in all halls.

The rods were removed identically in halls A, B and C. The test rods were each bagged in a PE bag still in the hall and transported to analysis on a transport truck.

The surface metals were determined according to ASTM F 1724-96 by chemical dissolution of the silicon surface and subsequent analysis of the dissolution solution by means of inductively coupled plasma mass-spectrometry (ICPMS).

However, the cleaning cycles in the three halls were different. In hall A, cleaning was performed most frequently, as may be seen in table 1 hereinafter. In hall C, all parts were only cleaned every 10 weeks.

For the cleaning, in all halls a mixture containing demineralized water and anionic/ionic surfactants was used, having the following mixing ratio: some tablespoons of cleaning agent (5-15% anionic and <5% zwitterionic surfactants) per 10 liters of demineralized water.

TABLE 1

| Location | Frequency of cleaning per week | | | Surface contaminants in pptw | | |
|---|---|---|---|---|---|---|
| | Floor | Surfaces | Steel work | Fe | Zn | Na |
| Hall A | 2 | 7 | 1 | 35 | 2 | 7 |
| Hall B | 1 | 1 | 0.13 | 45 | 3 | 9 |
| Hall C | 0.1 | 0.1 | 0.1 | 100 | 12 | 50 |

For all of the metals studied, owing to the more frequent cleaning of hall A, better values resulted for the surface contamination of the polysilicon produced there compared with the polysilicon from hall B, and markedly better values than in hall C.

The invention therefore also relates to a polycrystalline silicon rod containing surface contaminants of less than 50 pptw Fe, less than 5 pptw Zn and less than 10 pptw Na.

Preferably, the polycrystalline silicon rod contains surface contaminants of less than or equal to 35 pptw Fe, less than or equal to 2 pptw Zn and less than or equal to 7 pptw Na.

The invention claimed is:

1. A process for cleaning production rooms which comprise a multiplicity of CVD reactors for producing polycrystalline silicon, comprising: cleaning at least the outer casings of the CVD reactors, outer casings of pipelines, and the floors of the production rooms at least once within two weeks, wherein an aqueous cleaning liquid is used for cleaning.

2. The process of claim 1, wherein a fuzz-free cloth which is moistened with the cleaning liquid is used for cleaning.

3. The process of claim 1, wherein as cleaning machines for the floor cleaning, brush-cleaners, wet and dry vacuum cleaners, sweepers, scrubber-dryers, and single-disk machines are also used for floor cleaning.

4. The process of claim 1, wherein the cleaning liquid contains demineralized water.

5. The process of claim 1, wherein the cleaning liquid contains surfactants, and has a neutral pH.

6. The process of claim 1, wherein the cleaning liquid is a mixture of demineralized water and a neutral pH cleaning agent containing 5-15% non-ionic surfactants and less than 5% ionic surfactants.

7. The process of claim 1, wherein outer casings of the CVD reactors, pipelines and floors of the production rooms are cleaned at least once per week.

8. The process of claim 1, wherein firstly, the outer casings of the reactors and the pipelines are wiped with a fuzz-free cloth moistened with the cleaning liquid, and subsequently the floors are cleaned with the cleaning liquid.

9. The process of claim 1, wherein the floors are cleaned at least two times per week, and the pipelines and outer casings of the reactors are cleaned at least once per day.

* * * * *